United States Patent Office 3,047,408
Patented July 31, 1962

3,047,408
DENTAL CEMENT MATERIAL
Emery W. Dougherty, Milford, Del., assignor to The L. D. Caulk Company, Milford, Del., a corporation of Delaware
No Drawing. Filed Nov. 10, 1959, Ser. No. 851,960
8 Claims. (Cl. 106—35)

This invention relates to a novel type dental cement containing calcium hydroxide.

More particularly, the invention is directed to such a novel cement wherein certain esters of salicylic acid and polyhydric compounds are utilized as carriers for such base component. When such a cement is formulated as herein explained, the calcium hydroxide is dispersed throughout the body of the calcium salt of these esters, in large part thereby producing the several advantages and high degree of utility of the invention as hereinafter outlined.

Dispersions of calcium hydroxide in water, and in aqueous and organic solutions of film formers have been utilized in dentistry for years as a means of placing dispersed calcium hydroxide over the prepared dentine surfaces of tooth cavities. There are two desired and beneficial effects flowing from the application of calcium hydroxide in this manner. One is that the calcium hydroxide serves as a protective barrier for pulpal tissue against the attack of acid from certain filling materials, i.e., the same neutralizes the inorganic acids found in many filling materials, and therefore serves as a barrier between the acid filling materials and the tooth, protecting the tooth from such acids. The second benefit and desired effect is the stimulation of the formation of secondary dentin shown when dispersions of calcium hydroxide in aqueous solutions of film formers are applied over near or actual exposures of the living pulp. This stimulation is often important to the preservaition of a vital tooth and serves as an adjunct to many successful therapeutic treatments. Commercial products containing calcium hydroxide suspended in film forming solutions have been made available to dental practice but have exhibited certain deficiencies.

When films of calcium hydroxide are laid down from a solution of water soluble film formers in which calcium hydroxide is suspended, the time of formation of the film is lengthy since volatilization of the water is required. These aqueous dispersions are apparently innocuous and non-toxic to pulpal tissue. By contrast, when films of calcium hydroxide are laid down from an organic solution of film formers, e.g., chloroform as a solvent, the volatilization of the low boiling solvent occurs rapidly. However, the use of such an organic solvent poses problems because of the toxic effects of the solvents on pulpal tissue. Therefore, although film formation is rapid the use of such an organic solvent limits the application of such a compound to instances where no involvement between the pulp of the tooth and the said organic solvent can be expected.

The compositions of the present invention are particularly suited to the applications under discussion, providing, as well, advantages not previously obtained with simple dispersions of calcium hydroxide in film formers. More particularly, the compositions of the present invention are mixtures of certain substituted phenols, more fully described later, with calcium hydroxide. These mixtures, obtaining a dental cement-like consistency when combined, are expeditiously placed within a tooth cavity by existing dental techniques. Shortly after they are so placed, these mixtures react to form a hard, rigid mass of calcium phenolate in which an excess of calcium hydroxide is dispersed. Films containing calcium hydroxide laid down from a solvent, as previously described, had lacked body and rigidity and could not effectively be used as bulk lining materials. For these reasons the same often required a supporting layer of zinc phosphate, or other dental cement, to provide the non-yielding base necessary to protect the pulp during the filling operation. However, the products of the instant invention are in themselves hard and rigid, and sufficiently non-yielding to very often permit their use without application of a dental cement to further protect the tooth from the shock and stresses occurring during the filling operation.

Calcium phenolates so formed harden rapidly after placement in the tooth. They are rigid and permeable to water so that a solution of varying concentrations of calcium hydroxide is obtained when water permeates the rigid mass. The concentration of calcium and hydroxyl ions in this solution is a partial function of the concentration of calcium hydroxide remaining in excess in the reaction medium, and this is controlled by formulation.

Many substituted phenols are capable of reacting with calcium hydroxide. Among those are the parent compound, phenol; also, resorcinol, pyrogallol, eugenol, guaiacol, resorcinol monomethyl ether, salicylic acid and its methyl ester. To facilitate reaction the phenolic compound is preferably a liquid. Although it is possible to obtain reaction with solid phenolic compounds by carrying these compounds to the reaction site in a vehicle which may then serve as a plasticizer in the mass of reaction product, the homogeneity of the final product is considerably greater when a liquid phenolic compound is used. Rigidity of the product is increased while friability is decreased, as a result of this greater homogeneity. The reaction of the liquid compounds of the above group of substituted phenols is so extremely rapid that a solid reaction mass is formed before the powdered calcium hydroxide and, for instance, eugenol, can be mixed to a dental cementing consistency. Similar results are obtained with methyl salicylate, guaiacol, and resorcinol monomethyl ether. The dilution of the substituted phenols with certain plasticizers can delay the formation of the rigid calcium phenolate but leads to a reduction in strength.

A more suitable method of controlling the reaction rate is to dilute the solid powdered calcium hydroxide with solid powdered inert filler such as titanium dioxide. This procedure may be used in conjunction with plasticizers to provide a more pronounced effect than either method alone. The following examples define the technique more fully. When one part calcium hydroxide, powdered, U.S.P., has been slurried with one part eugenol, U.S.P., the calcium eugenolate forms in 0.1 to 0.5 minute depending on the calcium hydroxide used. When one part of calcium hydroxide U.S.P. is mixed with one part of a solution of eugenol and 23% raw linseed oil, a hardening time of up to approximately 0.6 minute is obtained. However, when one part of a mixture of solid powders, made up of 100 parts calcium hydroxide U.S.P. and 100 parts of titanium dioxide-calcium sulfate pigment are mixed with one part eugenol, U.S.P., a setting time of 2.5 to 5 minutes is obtained. The product so formed has a compressive strength of 1240 p.s.i. after having been stored in distilled water for 24 hours. When one part of the same calcium hydroxide-titanium dioxide-calcium sulfate mixture is slurried with one part of a 23% solution of raw linseed oil and eugenol the calcium eugenolate is formed in 6 to 10 minutes. But here the product so formed has a compressive strength of only 300 p.s.i. after 24 hours storage in distilled water.

In the instant invention, I have provided for more suitable products capable of reaction with calcium hydroxide. These are obtained by the esterification of salicylic acid with glycols and other polyhydric compounds. In this manner, products which are substituted phenols, may be obtained with reduced, more suitable reactivity toward calcium hydroxide. Suitable reactivity and therefore suitable hardening time of a slurry of calcium hydroxide and the substituted phenol can thus be obtained.

It is thus a primary object of this invention to provide a composition for dental use particularly suited to the applications under discussion, such having advantages for these applications not previously obtained with simple dispersions of calcium hydroxide in solutions of known film formers. More particularly, the invention relates to the formation of a calcium salt of certain phenolic compounds by the reaction of calcium hydroxide, present in the reaction medium in stoichiometrical excess, with these certain phenolic compounds, particularly the esters of salicylic acid as hereafter described.

It is a further object of this invention to provide a self-hardening cement with calcium hydroxide included in its composition, that would not only be fast-setting, a desired requisite, but also consistent with this aim, a cement which is non-toxic and further, exhibits a rigid and non-yielding body after settng. Such fast setting characteristic of a self-hardening cement composition is indispensible in a cavity lining material. Additionally, the non-toxic quality of the vehicle carrying the calcium hydroxide into the tooth is likewise, and obviously, indispensible. Manifestly, nothing would be gained by defeating the calcium hydroxide treatment through the use of an incompatible carrier.

Another object of the invention is the provision of a cement of the described type having a permeable cement structure and one containing an excess quantity of calcium hydroxide, always available in the composition, so that the desired and enumerated effects, above mentioned, are carried out for a long period of time in the tooth structure. In attaining the objective of permeability the instant invention recognizes the stimulus of calcium hydroxide to form secondary dentine depends on the availability of the calcium hydroxide within the tooth. Likewise, calcium hydroxide must be available to neutralize the acidic liquids of many filling materials. Permeability in this instance means the passage of moisture into and out of the cement without effecting rigidity. It is thus clear that permeability, without loss of rigidity in the cement structure, is an important characteristic and advantage of the instant lining material. Along the same line, the required excess of calcium hydroxide in the composition directly contributes to the long-time effectiveness of this lining material. Quite reasonably, the crystalline body of the cement must have an abundance of this agent. The supply of hydroxide must be ample, and in this invention, is ample, to permit these processes to continue indefinitely.

There are further advantages in my formulation: the calcium hydroxide composition can be easily and conveniently carried to a cavity preparation. Also, the constituents of the slurry react rapidly to form a rigid product, containing calcium hydroxide dispersed within its body. The reaction to form the calcium salt is accelerated by the moisture and elevated temperature of the tooth, so that techniques for its use are rapid, and long periods of inactivity for the dentist while he waits for the material to harden are not necessary. The excess of calcium hydroxide is available for extraction by the aqueous solution in the tooth delivered through the dental tubulae and does, in this manner, promote the formation of secondary dentin.

Additionally, these compositions of calcium hydroxide and substituted phenols, as herein described, have better mechanical properties than the simple salts of eugenol or guaiacol. At equivalent concentrations of filter and plasticizer, compressive strenghs of the new compounds are greatly superior. Because of the more suitable reactivity of these, it is not necessary to plasticize these compositions to obtain suitable hardening time, and mechanical strengths need not necessarily be reduced as a consequence.

The referred to esters of salicylic acid may be prepared either by direct esterification of the acid and the alcohol, or by trans-esterification of a low molecular weight ester of salicylic acid and glycol, using a catalyst.

I have found that the latter process is more convenient for preparation of esters to be used to form calcium phenolates, carrying out the reaction with a slight excess of methyl salicylate. The result of the esterification, in the case that it is not complete, is a complex mixture of mono and di-salicyclic acid esters. To better define the substituted phenols which are utilized as the carrier for the calcium hydroxide, reference is made to the following examples, wherein a brief description of several embodiments of the invention is set forth.

*Example I*

4.20 equivalents of 1,3 butylene glycol and 4.41 equivalents of methyl salicylate are reacted at ambient temperatures of from 110 to 210° C. using sodium methylate as a catalyst, and collecting 160 ml. of methyl alcohol. One part by weight of the product of this reaction was mixed with one part by weight of powdered calcium hydroxide, U.S.P. This mixture reacted to form a hard, rigid mass in four minutes and had a compressive strength of 4500 p.s.i. after having been stored 24 hours in distilled water at 37° C. The water after storage was alkaline.

*Example II*

One part by weight of the product of the interchange reaction between 1,3-butylene glycol and methyl salicylate described in Example I, containing 0.5% distilled water, was mixed with one part by weight of a mixture of equal weight of calcium hydroxide, U.S.P., and a titanium dioxide-calcium sulfate filler. The mixture hardened in four minutes and had a compressive strength of 5500 lbs. p.s.i. after having been stored twenty-four hours in distilled water at 37° C. The water after storage was alkaline.

*Example III*

1.20 equivalents of glycerine and 1.22 equivalents of methyl salicylate were reacted using sodium methylate as a catalyst at temperatures varying from 135 to 210° C., and collecting 36.6 ml. of methanol. 16 parts by weight of the product of this reaction were mixed with four parts by weight of a polyester plasticizer, produced under the trade name "Plastolein 9720."

A blend of solid powders was prepared, as follows: calcium hydroxide, U.S.P., 25 parts; zinc oxide U.S.P., 75 parts; and titanium dioxide, 25 parts. This blend was then mixed with the solution of substituted phenol and polyester plasticizer as prepared in accordance with the first paragraph of this example. The ratio of these components was as follows: a ratio of one and one-half parts powder to one-half part liquid.

A dental cement-like mix was thusly obtained. Such mix set to a rigid mass in approximately 3.5 minutes and had a compressive strength after twenty-four hours, in water at 37° C., of 3700 lbs. p.s.i.

*Example IV*

A mixture of 1-hydroxy 2-ethylhexyl salicylate, 1,6-(2-ethylhexyl) di-salicylate and methyl salicylate was prepared by reacting methyl salicylate (160 parts) with ethyl hexane diol (73 parts) in the presence of sodium methylate, and collecting 31 ml. of methyl alcohol. The reaction was carried out at temperatures varying from 145° to 200° C. This prepared mixture (16 parts) was then mixed with four parts of a polyester plasticizer, manufactured by Emery Industries, Inc., under the trade name, "Plastolein 9720." The latter is representative of a typical polyester, i.e., it is the polycondensation product of dicarboxylic acids with dihydroxy alcohols and prepared from $C_5$ to $C_{16}$ acids and a polyhydric alcohol. Such polyester has an acid number of 5 maximum and a hydroxyl value 20 maximum. It has an average molecular weight of about 850 and a viscosity of 240 centipoises at 30° C. A full description of such polyester, as defined in the foregoing, may be found in the Emery Industries, Inc. published booklet, EM–761–A, copyrighted in 1954. The foregoing polyester definition is also in accord with the description found in the book, "Polyesters and Their Application" by Bjorksten Research Laboratories, Inc., Reinhold Publishing Company, 1956, page 11, wherein "polyester" is referred to as the polycondensation product of dicarboxylic acids with dihydroxy alcohols, which may be modified by monocarboxylic acids, monohydroxy alcohols, and even small amounts of polycarboxylic acids and polyhydroxy alcohols.

One and one-half parts of the blend of solid powders described in Example III were mixed with the liquid solution of the first paragraph of this example at a ratio of one and one-half parts powder to 0.5 part liquid. A dental cement-like mix was thus obtained that set to a rigid mass in approximately eleven minutes, and had a compressive strength of approximately 5000 p.s.i. after 24 hours in distilled water at 37° C. The water after storage was definitely alkaline.

*Example V*

A paste was prepared by mixing twenty parts of the reaction product of 4.20 equivalents of 1,3 butylene glycol and 4.41 equivalents of methyl salicylate, and twenty parts of a titanium dioxide-calcium sulfate pigment. The preparation of the ester was carried out at temperatures ranging from 110–210° C. using sodium methylate as a catalyst and had a viscosity at 23° C. of approximately 1200 centipoises.

A second paste was prepared by mixing 36.5 parts ethyl toluene sulfonamide; 53.5 parts calcium hydroxide, U.S.P., 9.7 parts zinc oxide; and 0.3 part zinc stearate. One part by weight of this paste was mixed with two parts by weight of the paste described in the first paragraph of this example. A dental cement-like mix was obtained that hardened in approximately four minutes and after 24 hours in distilled water at 37° C., the same had a compressive strength of approximately 2000 p.s.i.

Although plasticizers may be present in the reaction medium, their presence may reduce the compressive strength of the hardened product. It should further be observed that although solid fillers such as calcium sulfate, titanium dioxide, zinc oxide and silica may be present, their presence does not retard nor preclude the hardening reaction.

In summary then, my invention contemplates utilizing, as a dental cementing composition, the reaction product of an excess of calcium hydroxide and an ester or mixture of esters of salicylic acid. Such reaction can take place in the presence of a liquid vehicle or plasticizer. The word plasticizer should be construed to mean a compound which is miscible with the appropriate esters of salicylic acid under consideration and which serves to dilute the ester, but does not enter into the reaction between calcium hydroxide and the salicylic acid ester. Such plasticizers are preferably liquids at room temperature and are typified, as an example, by the compounds ethyl toluene sulfonamide, and the complex polymeric plasticizer produced under the trade name "Plastolein 9720." Such reaction can also be carried out in the presence of an inert filler preferably selected from the group consisting of titanium dioxide, zinc oxide, calcium sulfate and silica.

Such reaction product will obtain all of those advantages hereinbefore referred to and these in particular, constant liberation of calcium hydroxide to prolong treatment of the pulpal tissue; proper setting time within predetermined limits, obtained consistent with the required degree of hardness; lack of toxicity of the carrier or film former; and super abundance of the stated therapeutic agent, effective over the mentioned period of time due to permeability of the cementious composition.

Obviously, many modifications and equivalents of the invention hereinbefore set forth may be made without departing from the spirit and scope thereof, and therefore only such limitations should be imposed as are indicated in the appended claims.

I claim:

1. A dental composition consisting essentially of calcium hydroxide and an ester of a polyhydric alcohol and salicylic acid, the calcium hydroxide being present in stoichiometric excess over said ester, said ester and said calcium hydroxide being reactable to form a hard, rigid and permeable mass of a calcium phenolate containing available calcium hydroxide dispersed therein.

2. A dental composition consisting essentially of calcium hydroxide and an ester of a polyhydric alcohol and salicylic acid, said alcohol being selected from the group consisting of butylene-glycol, glycerine and ethyl hexane diol, the calcium hydroxide being present in stoichiometric excess over said ester, said ester and said calcium hydroxide reacting to form a hard, rigid and permeable mass of a calcium phenolate having free calcium hydroxide dispersed therein, said excess being in sufficient amount to permeate said mass, whereby said hydroxide is continuously available to promote dentin growth.

3. A dental cement composition consisting essentially of a first paste containing the reaction product of a polyhydric alcohol and salicylic acid, and a second paste comprising calcium hydroxide, zinc oxide and zinc stearate, said calcium hydroxide being present in stoichiometric excess over said reaction product, the calcium hydroxide of said second paste being reactable with the reaction product of said first paste to form, on admixture therewith, a hard, rigid and permeable mass of a calcium phenolate containing available calcium hydroxide dispersed therein.

4. A dental cement composition consisting essentially of a first paste containing the reaction product of about 4 equivalents of 1, 3 butylene glycol and about 4 equivalents of methyl salicylate, and a second paste comprising about 36 parts of ethyl toluene sulfonamide, about 53 parts of calcium hydroxide, about 9 parts of zinc oxide and about 0.3 part of zinc stearate, said calcium hydroxide being present in stoichiometric excess over said reaction product, said calcium hydroxide being reactable with said reaction product to form, upon admixture therewith, a hard, rigid and permeable mass of a calcium phenolate, said excess being in sufficient amount to permeate said mass of calcium phenolate, whereby said hydroxide is continuously available for promotion of dentin growth.

5. A dental composition consisting essentially of calcium hydroxide and an ester of a polyhydric alcohol and salicylic acid, said ester and said calcium hydroxide being reactable to form a hard, rigid and permeable mass of a calcium phenolate, said calcium hydroxide being present in stoichiometric excess over said ester and in sufficient amount to substantially permeate said phenolate, whereby said hydroxide is continuously available for promotion of dentin growth.

6. A dental cement composition consisting essentially of a mixture of about 20% of a mixture of 1-hydroxy 2-ethylhexyl salicylate, 1, 6 (2-ethylhexyl) di-salicylate and methyl salicylate, and about 80% of a blend of solid powders consisting of calcium hydroxide, titanium dioxide and zinc oxide, said calcium hydroxide being present in stoichiometric excess over said salicylates, said calcium hydroxide being reactable with said salicylates to form a hard, rigid and permeable mass of a calcium phenolate having available calcium hydroxide dispersed therein.

7. A composition as defined in claim 1 containing an inert, powdered filler selected from the group consisting of silica, titanium dioxide and calcium sulfate.

8. A composition as defined in claim 1 which contains a plasticizer miscible with the particular salicylic acid ester employed, said plasticizer not entering into the reaction between the ester and calcium hydroxide, said plasticizer consisting of ethyltoluenesulfonamide.

References Cited in the file of this patent

UNITED STATES PATENTS

| | | |
|---|---|---|
| 2,379,290 | Finley | June 26, 1945 |
| 2,397,498 | May | Apr. 2, 1946 |
| 2,516,438 | Wheeler | July 25, 1950 |
| 2,523,867 | Donnelly | Sept. 26, 1950 |
| 2,770,648 | Schurman | Nov. 13, 1956 |
| 2,936,242 | Brauer | May 10, 1960 |

UNITED STATES PATENT OFFICE
CERTIFICATE OF CORRECTION

Patent No. 3,047,408                                July 31, 1962

Emery W. Dougherty

It is hereby certified that error appears in the above numbered patent requiring correction and that the said Letters Patent should read as corrected below.

Column 3, line 75, for "filter" read -- filler --; column 5, line 65, for "compounds" read -- compound --.

Signed and sealed this 22nd day of January 1963.

(SEAL)
Attest:

ERNEST W. SWIDER
Attesting Officer

DAVID L. LADD
Commissioner of Patents